(12) United States Patent
Beaumont

(10) Patent No.: X2232
(45) Date of Patent: Dec. 3, 1814

(54) COTTON, WADDING

(76) Inventor: James Beaumont

James Beaumont
Letters Patent dated December 3, 1814.

The Schedule referred to in these Letters Patent and making part of the same containing a description in the words of the said James Beaumont himself of his mode of manufacturing Cotton Wadding.—

The cotton being previously carded in a cotton carding machine used in factories called a breaker is taken from the [illegible] or bats and put through the machine a second time in sufficient quantity and carded on that part of the machine called the drum; the machine is then stopped. A wooden roller or cylinder, which in the common operation of carding is turned by the friction of the drum is then well wet with a size made of gum, glue, flour or the like properly diluted to preserve it liquid & used warm. the size is put on with a sponge which the operator holds in one hand while he gently turns the drum with the other, continuing to press the size from the sponge upon the roller or cylinder until the whole surface of the sheet of cotton is properly sized and when dry the size forms a glutinous texture on the surface of the sheet of Cotton. The roller is then taken off & the sheet being cut crosswise is taken from the drum on [illegible] board & spread on the floor to dry. The sheet is [illegible] a little [illegible] and [illegible] when dry is [illegible] in [illegible]. The sheets [illegible] made are [illegible] feet long & [illegible] a half feet wide but the length & the breadth may be increased according to the [illegible] of the [illegible]

Witnesses
Timothy Fuller
Benj D. [illegible]

James Beaumont

I hereby give grant sell and convey all my right & title to these Letters Patent for making cotton [illegible] into

United States Patent

Patent No.: X2232

Nathaniel Kawomb of Norton for the sum of One hundred dollars which I hereby acknowledge to have received this Twelfth day of September in the year of our Lord one thousand eight hundred and twenty six as witness my hand Signed in presence of us
E. H. Lothrop
Thos. B. Lane James Beaumont (Received & Recorded anno August 24. 1844)

Ex